(12) United States Patent
Szczepanski

(10) Patent No.: US 9,919,559 B2
(45) Date of Patent: Mar. 20, 2018

(54) AXLE CARRIER HOUSING WITH A SWEPT SUPPORT RIB

(71) Applicant: FORD GLOBAL TECHNOLOGIES, LLC, Dearborn, MI (US)

(72) Inventor: Gerald Stephen Szczepanski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 145 days.

(21) Appl. No.: 14/567,141

(22) Filed: Dec. 11, 2014

(65) Prior Publication Data

US 2016/0167432 A1    Jun. 16, 2016

(51) Int. Cl.
  *B60B 35/16*  (2006.01)
  *B60B 35/14*  (2006.01)
  *B60B 35/12*  (2006.01)

(52) U.S. Cl.
  CPC ............ *B60B 35/166* (2013.01); *B60B 35/16* (2013.01); *B60B 35/125* (2013.01); *B60B 35/14* (2013.01); *B60B 2900/311* (2013.01)

(58) Field of Classification Search
  CPC ..... B60B 35/166; B60B 35/16; B60B 35/163; B60B 35/143
  USPC .......................................... 301/137; D12/126
  See application file for complete search history.

(56) References Cited

U.S. PATENT DOCUMENTS

| | | | |
|---|---|---|---|
| 1,689,989 A * | 10/1928 | Williams | B60B 35/16 29/463 |
| 2,140,190 A * | 12/1938 | Riblet | B60B 35/121 475/246 |
| 2,478,180 A | 1/1946 | Buckendale | |
| 3,041,890 A * | 7/1962 | O'Brien | B60B 35/163 74/607 |
| 3,905,089 A | 9/1975 | Osenbaugh et al. | |
| 4,016,947 A * | 4/1977 | Chamberlain | B60B 35/006 180/378 |
| 6,398,689 B1 * | 6/2002 | Morse | F16C 25/06 384/583 |
| 6,688,433 B1 * | 2/2004 | Hauser | B60K 17/10 184/6.24 |
| 7,137,183 B2 * | 11/2006 | Stuart | B60B 35/16 180/378 |

(Continued)

OTHER PUBLICATIONS http://www.ebay.com/itm/2014-F-150-4x4-Rear-Carrier-Differential-Axle-3-55-Ratio-9-75-034-Ring-Gear-Oem-14-11912576794492?_trksid=p2054897.I4275; pp. 4; retrieved Nov. 4, 2014.

*Primary Examiner* — Kip T Kotter
*Assistant Examiner* — Scott A Browne
(74) *Attorney, Agent, or Firm* — James Dottavio; Brooks Kushman P.C.

(57) ABSTRACT

An axle carrier housing for a beam axle assembly having at least one continuous transversely extending support rib with a portion of the support rib swept longitudinally rearward of a pair of axle tubes. The support rib has end portions initiating adjacent where the axle tubes connect to the housing and a central portion extending offset from the axle tubes. The central portion of the support rib provides a portion of an access cover attachment surface. The housing may define a pair of support ribs substantially mirroring each other on lower and upper portions of the housing. The support ribs provide for a structural member substantial enough to handle the loads of the axle assembly while also minimizing both the weight of the housing and fluid volume.

13 Claims, 2 Drawing Sheets

(56) References Cited

U.S. PATENT DOCUMENTS

| | | | |
|---|---|---|---|
| 7,559,404 B2* | 7/2009 | Seeds | B60B 35/003 180/378 |
| D600,167 S * | 9/2009 | Maguire | D12/126 |
| D631,799 S * | 2/2011 | Maguire | D12/126 |
| 8,657,716 B1* | 2/2014 | Whyte | F16H 57/031 475/220 |
| 9,022,892 B1* | 5/2015 | Marsh, Jr. | F16H 48/11 384/583 |
| D747,670 S * | 1/2016 | Chung | D12/160 |
| 2003/0110885 A1* | 6/2003 | Beutler | B60K 17/16 74/606 R |
| 2004/0079577 A1* | 4/2004 | Pollock | F16H 57/037 180/354 |
| 2005/0082780 A1* | 4/2005 | Seeds | B60B 35/003 280/93.512 |
| 2005/0168057 A1* | 8/2005 | Eschenburg | B60B 35/006 301/137 |
| 2006/0103232 A1* | 5/2006 | Beutler | B03C 1/286 301/137 |
| 2007/0145816 A1* | 6/2007 | Gile | B60B 35/001 301/132 |
| 2008/0295643 A1* | 12/2008 | Zalanca | B60B 35/006 74/607 |
| 2013/0334786 A1* | 12/2013 | Albergante | B60B 35/125 280/124.11 |
| 2014/0021693 A1* | 1/2014 | Platt | B60K 17/16 280/124.11 |
| 2015/0087461 A1* | 3/2015 | Jackson | F16H 48/08 475/160 |
| 2015/0137586 A1* | 5/2015 | Bassi | B60K 17/36 301/137 |

* cited by examiner

AXLE CARRIER HOUSING WITH A SWEPT SUPPORT RIB

TECHNICAL FIELD

This disclosure relates to beam axles and more specifically to carrier assemblies of beam axles having a swept support rib.

BACKGROUND

Automotive beam axles often consist of a central carrier assembly with axle tubes connectedly extending outwardly from the carrier assembly toward wheels. The central carrier assembly commonly comprises a sealed housing and cover disposed around a differential assembly. The differential assembly includes a plurality of gears and is configured to couple an input shaft, also known as a drive-shaft, to two output shafts, also known as axle-shafts. Proximal ends of the two axle-shafts are commonly coupled to the differential within the carrier and extend through the axle tubes outwardly through wheel bearings and retainers/seals near distal ends of the axle-shafts. Hub assemblies are commonly attached to the end of the axle tubes and connect the distal ends of the axle-shafts to the wheels.

The axle tubes are commonly connected to the frame of the vehicle via suspension components. The beam axle is configured to support a portion of the weight of the vehicle, also known as the sprung mass of the vehicle. The transfer path of the sprung mass may travel from the frame through the suspension components, through the axle tubes and carrier, through the axle-shafts and differential, and into the wheels which contact the ground. The term wheels, as used here, also may include tires.

Axle carriers for these applications are designed to withstand both torsional and suspension loads and are often substantial in size and weight. Axle carriers for these applications are also designed to hold lubrication fluids for the differential and at least portions of the input and output shafts or components that transfer rotation/torque between the differential and input and output-shafts. Weight and fluid level reduction on these designs is often difficult. Solutions which reduce fluid volume commonly increase weight, and solutions which minimize weight commonly increase fluid volume. Increased difficulty may be added by the differences in parting line orientations between the inside core and external mold for the housing of the carrier.

SUMMARY

One aspect of this disclosure is directed to a beam axle for an automobile. The beam axle has a differential assembly configured to transfer torque between a drive-shaft and two axle-shafts. The beam axle has a housing disposed around the differential assembly and a portion of the axle-shafts. The beam axle has axle tubes disposed around the axle-shafts and extending from the housing. The housing defines a continuous support rib with end portions extending substantially coaxially with the axle tubes and a central portion connecting and offset from the end portions.

The central portion of the continuous support rib may define a portion of a mounting surface for a removable cover to access the differential assembly and portions of the axle-shafts. The continuous support rib may have intermediate portions connecting the end portions to the central portion. The intermediate portions may extend longitudinally. The end portions and intermediate portions may substantially opposingly mirror their respective counterpart across a longitudinal support rib center line. The drive-shaft may define an input axis and the longitudinal rib center line may be offset from the input axis.

The continuous support rib may extend from a lower portion of the housing in a substantially vertical direction. The continuous support rib may be a first support rib, and the housing may further have a second support rib extending from an upper portion of the housing in the substantially vertical direction. The second support rib may also substantially mirror the first support rib.

Another aspect of this disclosure is directed to an axle assembly. The axle assembly has a pair of axle tubes fixedly extending from a housing. The housing defines a support rib extending outwardly from an exterior surface. The support rib has end portions adjacent to and substantially in line with a center-line of the axle tubes. The support rib has a central portion swept away from the center-line of the axle tubes. The support rib provides for axle load support while reducing weight and fluid fill of the housing.

A portion of the central portion of the support rib may define a portion of an access cover mounting surface. The support rib may be a first support rib extending from a lower portion of the housing. The housing may further define a second support rib extending from an upper portion of the housing. The second support rib may opposingly mirror the first support rib.

Portions of the first and second support ribs may define upper and lower portions of an access cover mounting surface. The housing may further define a number of cover attachment holes. Some of the number of cover attachment holes may be disposed along the central portions of the first and second support ribs. A cover may be removably connected to the housing via fasteners. Some of the fasteners may utilize cover attachment holes in the support ribs.

A further aspect of this disclosure is directed to an axle carrier. The axle carrier has a housing defining a pair of opposing output holes disposed along a transverse axis. The axle carrier has an access opening disposed longitudinally offset from the transverse axis. The axle carrier has a continuous support rib extending vertically from the housing. The continuous support rib has end portions adjacent the output holes. The end portions are disposed substantially along the transverse axis. The continuous support rib has a central portion disposed between the end portions. The central portion defines a first segment of the access opening.

The continuous support rib may be a first continuous support rib having first end portions and a first central portion. The axle carrier may further comprise a second continuous support rib. The second continuous support rib may extend vertically from the housing having second end portions and a second central portion substantially mirroring the respective portions of the first continuous support rib. The second central portion may define a second segment of the access opening.

The housing may define a number of cover attachment holes. Some of the cover attachment holes may be disposed in the central portions of the first and second continuous ribs along the first and second segments of the access opening. The central portions of the first and second continuous ribs along the first and second segments of the access opening may define upper and lower portions of a cover mounting surface.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
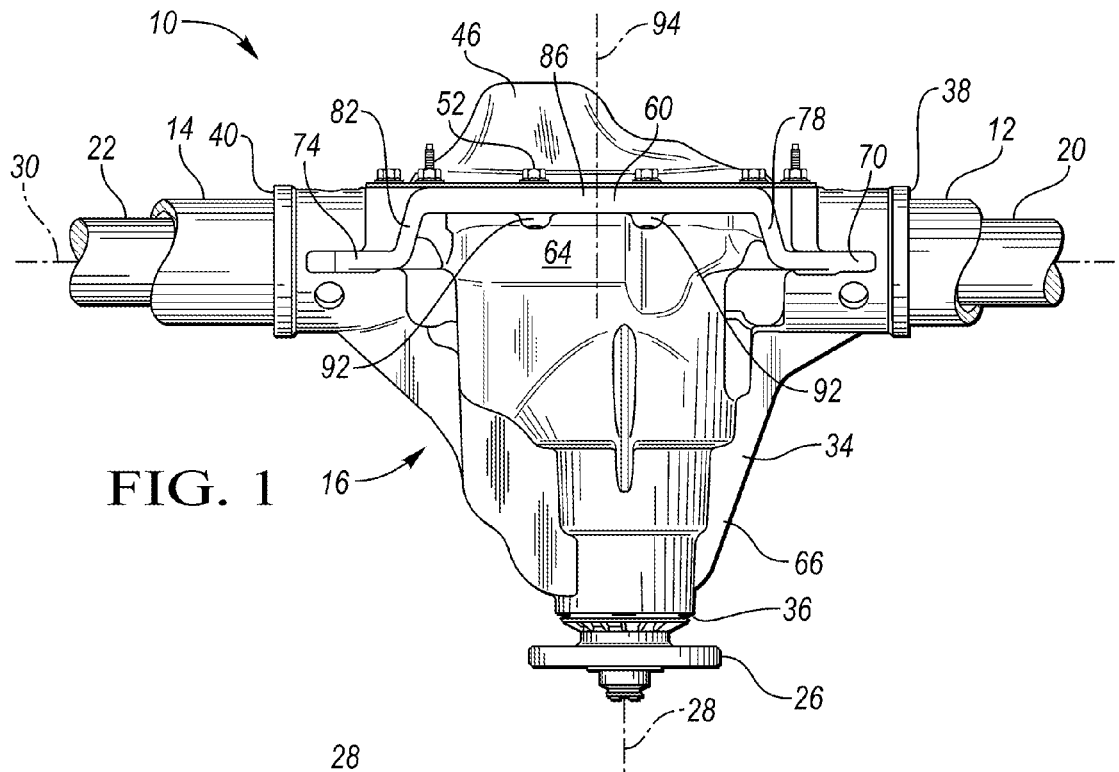
FIG. 1 is a bottom partial view of an axle assembly having a housing with a swept support rib and a cover mounted on the housing.
Figure 2:
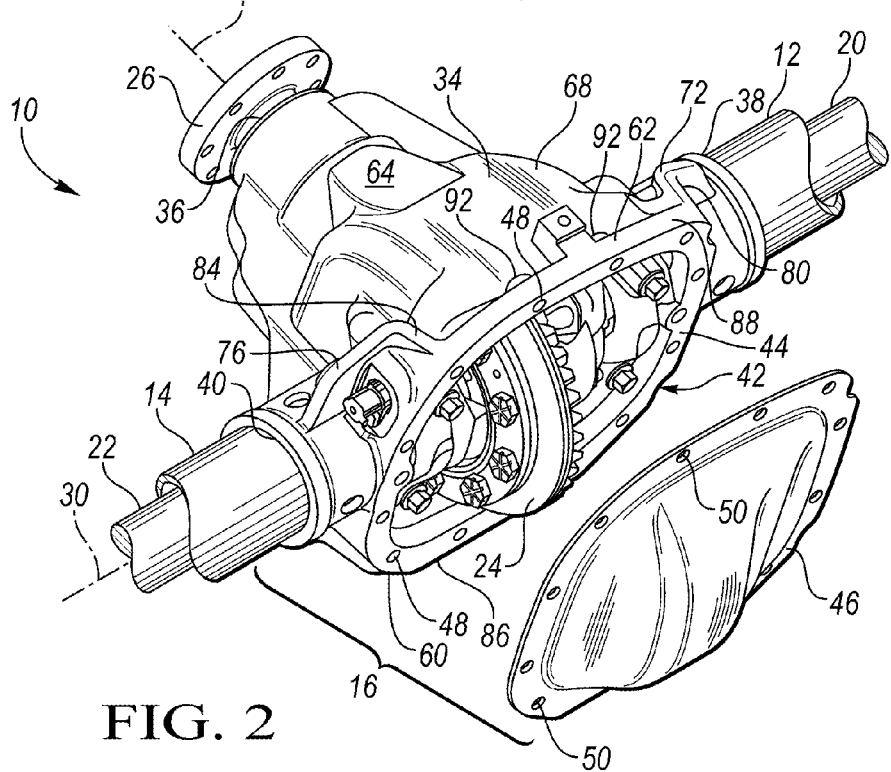
FIG. 2 is a perspective partial view of an axle assembly having a housing with a swept support rib and a cover removed from an access opening.

FIGS. 1 and 2 show an axle assembly 10, which may also be called a solid axle or beam axle. Axle assembly 10 has a right-hand axle tube 12 and a left-hand axle tube 14 connected to and extending from an axle carrier assembly 16. The pair of axle tubes 12, 14 may be connected to a vehicle via suspension components (not shown). The axle tubes 12, 14 may fixedly extend transversely from the carrier across the vehicle to support ground wheels (not shown). The ground wheels may be steerable or non-steerable. Two non-limiting examples include the axle assembly 10 being a solid rear axle in which the ground wheels are non-steerable, and a solid front axle, such as on a four-wheel drive vehicle, in which the ground wheels are steerable. The ground wheels may be directly or indirectly connected to and driven by axle-shafts 20, 22.

The axle-shafts 20, 22 may be directly or indirectly connected to and driven by a differential assembly 24 (shown only in FIG. 2). The differential assembly 24 may include, or be driven by, a pinion flange 26, which in-turn may be directly or indirectly connected to and driven by a drive-shaft (not shown). The drive-shaft may be part of, or is directly or indirectly connected to, a powertrain driven by a prime mover (not shown) such as an engine, a motor, or any equivalent or combination.

The differential 24 may be a particular type of a planetary gear train that has the property that the angular velocity of its carrier is the average of the angular velocities of its sun and ring gears. The differential 24 allows the outer drive wheel to rotate faster than the inner drive wheel during a turn. The average of the rotational speed of the two driving wheels equals an input rotational speed of the drive-shaft. In other words, the differential 24 is configured to transfer torque between the drive-shaft and the two axle-shafts 20, 22 while allowing them to rotate at differing speeds. The pinion flange 26 and drive-shaft may collectively, or individually, define an input axis 28 which is approximately located along the center point of the pinion flange 26. The input axis 28 may extend more in a longitudinal direction than in a transverse or vertical direction.

The axle tubes 12, 14 and the axle-shafts 20, 22 disposed therein, may collectively, or individually, define a transverse axis 30 which extends approximately along the center point of the axle tubes 12, 14. It should be understood that variation in the circularity and straightness of the axle tubes 12, 14, variation in the connection of the axle tubes 12, 14 to the carrier 16, variations in the centering of the axle-shafts 20, 22 within the axle tubes 12, 14, and movement of the axle assembly 10 relative to the vehicle as the suspension moves, as well as the flexing of all of the components while moving, may vary the transverse axis 30. As such, the transverse axis 30 is an approximation and not an absolute fixed axis. The transverse axis 30 extends more in the transverse direction than in a longitudinal or vertical direction.

The carrier 16 has a housing 34. Housing 34 may be a single unitary cast iron housing, although other material and forming methods may be used. The housing 34 houses, protects and carries the differential 24. The gearing components of the differential 24 are disposed within the housing 34. The housing 34 also acts as a vessel to hold a lubricating fluid (not shown), such as oil with or without modifiers. A portion of the differential 24 may be immersed within the lubricating fluid, and as the gearing of the differential 24 rotates it is picked up by gearing and transferred throughout the housing 34.

The housing 34 defines an inlet 36 to which the pinion shaft of the hypoid gearset may pass through to connect with the pinion flange 26. Appropriate seals and bearings may be disposed within the inlet 36 to seal the carrier 16 at the inlet 36 and substantially retain the lubricating fluid within the housing 34. The housing 34 also defines a pair of opposing output holes 38, 40 to which proximal ends of the axle tubes 12, 14 are connected. The axle tubes 12, 14 may be nestedly disposed within the output holes 38, 40. The axle tubes 12, 14 are coaxial with the output holes 38, 40, and as such, the output holes 38, 40 are disposed along, and may be considered to define, the transverse axis 30. As with the inlet, the output holes 38, 40 are sealed with the axle tubes 12, 14 to substantially retain the lubricating fluid within the housing 34.

The housing 34 defines an access opening 42, as best shown in FIG. 2. The access opening 42 is located and sized to allow access to and maintenance of the axle assembly 10 and more specifically the differential 24. The access opening 42 may also allow for disconnecting of the axle-shafts 20, 22 from the differential 24. The access opening 42 is disposed longitudinally offset from the transverse axis 30.

The housing 34 defines an access cover mounting surface 44 surrounding a perimeter of the access opening 42 to which a removable cover 46 may be attached. The housing may have a number of cover attachment holes 48 located along the mounting surface 44. The cover 46 may have a number of corresponding housing attachment holes 50 that align with the cover attachment holes 48. A number of fasteners 52 may cooperate with the housing and cover attachment holes 48, 50 to connect the cover 46 to the housing 34. A gasket (not shown) may also be disposed between the cover 46 and housing 34. The cover 46 is sealed to the housing 34 to substantially retain the lubricating fluid within the housing 34.

The housing 34 connects the two axle tubes 12, 14 to each other and provides the primary structural support for the center region of the beam axle 10. The mass of the vehicle being transferred to the beam axle through the axle tubes 12, 14 to the wheels and the ground provides vertical loads on the housing 34. As well, since the vehicle mass is connected via a suspension, and the vehicle drives over varying terrain, the loads may increase and decrease in cyclical and non-cyclical fashion. Thus the housing 34 must be strong enough to support the loads of the vehicle in the varying environments it is driven in, while at the same time remaining as light weight, low cost, and as efficiently packaged as possible, as is desired for most vehicle components. Unfortunately, light weight and efficient packaging with low cost is difficult.

Figure 3:
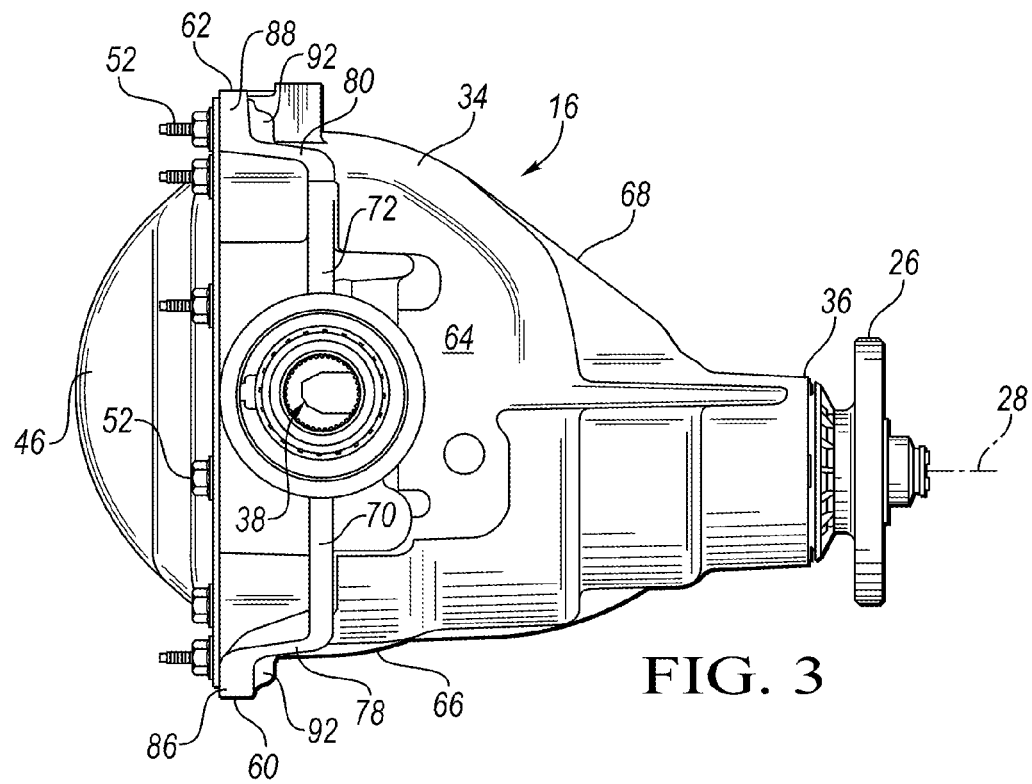
FIG. 3 is a side view of an axle carrier assembly having a housing with a swept support rib.
Figure 4:
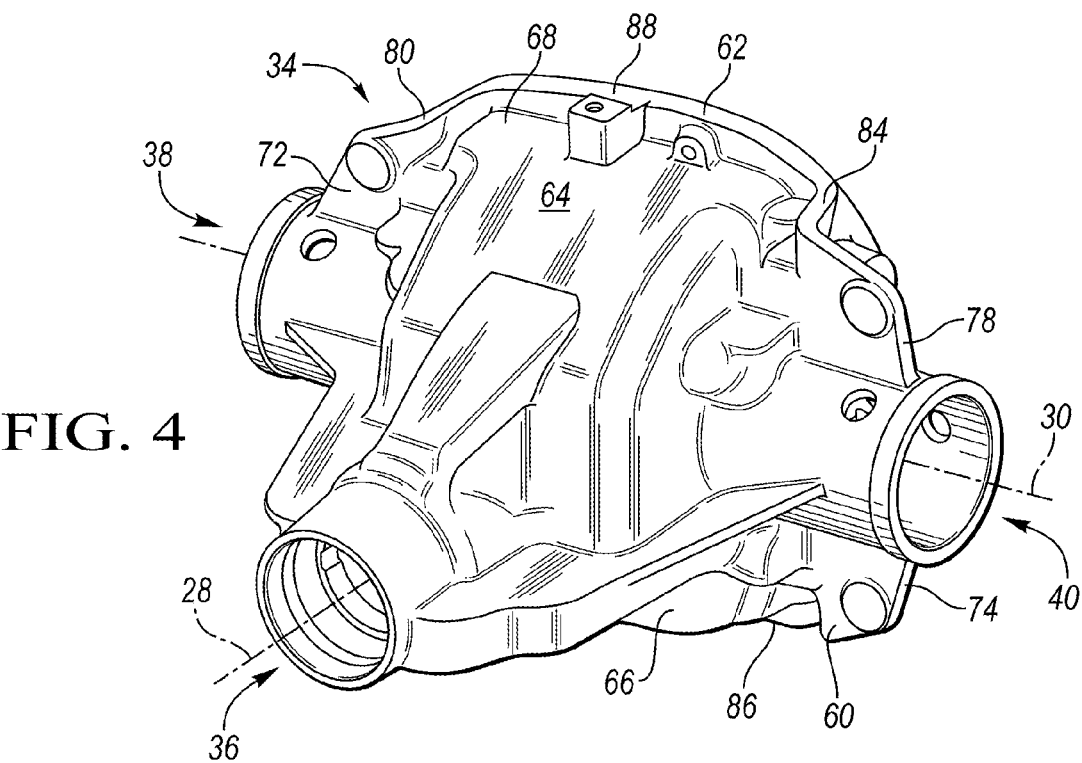
FIG. 4 is perspective view of a carrier housing with a swept support rib.

FIG. 3 is a side view of the axle carrier assembly 16 without the axle tubes 12, 14 (see FIGS. 1 and 2). FIG. 4 is a perspective view of just the housing 34.

Referring to all Figures, a first support rib 60 and second support rib 62 can be seen extending outwardly from a housing surface 64. The support ribs 60, 62 extend substantially vertically from the housing surface 64. The housing 34 may be divided into a lower portion 66 and an upper portion 68. The first support rib 60 may extend from the lower portion 66 of the housing 34 in a substantially vertical direction. The second support rib 62 may extend from an upper portion 68 of the housing 34 in the substantially vertical direction. The second support rib 62 may substantially opposingly mirror the first support rib 60. Although two support ribs 60, 62 are shown, the housing 34 may only have a single support rib 60 or 62 on either the lower or upper portions 66, 68.

The support ribs 60, 62 have respective first and second right-hand end portions 70, 72, and first and second left-hand end portions 74, 78 located adjacent the output holes 38, 40. The end portions 70, 72, 74, 76 initiate adjacent to, and extend substantially coaxially with, the axle tubes 12, 14 (see FIGS. 1 and 2). The end portions 70, 72, 74, 76 extend transversely and substantially along the transverse axis 30.

The support ribs 60, 62 may also have respective first and second right-hand and left-hand intermediated portions 78, 80, 82, 84 extending from the end portions 70, 72, 74, 76 to first and second central portions 86, 88. The intermediate portions 78, 80, 82, 84 connectedly extend transversely and longitudinally between the end portions 70, 72, 74, 76 and the central portions 86, 88. The central portions 86, 88 extending transversely across the housing 34 and are disposed between the end portions 70, 72, 74, 76. The central portions 86, 88 are offset from the end portions 70, 72, 74, 76. The intermediate portions 78, 80, 82, 84 and central portions 86, 88 cooperate to provide portions of the support ribs 60, 62 sweeping longitudinally away from the end portions 70, 72, 74, 76, and thus are swept away from, and non-axial with, the axle tubes 12, 14 (as seen in FIGS. 1 and 2).

Portions of the central portions 86, 88 of the support ribs 60, 62 may provide portions of the access cover mounting surface 44. The first central portion 86 may define a lower portion of the access cover mounting surface 44. The second central portion 88 may define an upper portion of the access cover mounting surface 44. Said another way, the access cover mounting surface 44 surrounds a perimeter of the access opening 42 and the first and second support ribs 60, 62 may define first and second segments of the perimeter of the access opening 42.

The swept support ribs 60, 62, as shown and described here, provide for a structural member substantial enough to handle the loads of the axle assembly 10 while also minimizing both the weight of the housing 34 and fluid volume. Integration of portions of the access cover mounting surface 44 into the structural ribs 60, 62 helps to reduce casting pockets which may retain lube. The swept support ribs 60, 62 also help to reduce the cross sectional area and weight of the housing 34. The swept rib design may also be cast utilizing standard casting techniques.

The central portions 86, 88 may also include external projections 92 to which the cover attachment holes 48 are disposed within. The moving of the projections for cover attachment holes 48 to the exterior as opposed to protruding into the interior, as previous solutions have been cast, also aids in the reduction of trapped lube in the resulting pockets.

The support ribs 60, 62 may also define a longitudinal support rib center line 94, as shown in FIG. 1, in which the support ribs 60, 62 are substantially mirrored across from the left-hand side to the right-hand side. The longitudinal support rib center line 94 may be offset from the input axis 28.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A beam axle comprising:
   a differential configured to transfer torque to two shafts;
   a housing disposed around the differential; and
   axle tubes disposed about the shafts and extending from first and second openings of the housing, wherein the housing defines a continuous support rib that extends from a first end portion to a second end portion, each end portion entirely extending along an axis substantially coaxially with the axle tubes and a central portion offset from the first and second end portions, wherein the first and second end portions define a first end face and a second end face respectively that face the axle tubes;
   the continuous support rib having a first intermediate portion between the first end portion and the central portion, and a second intermediate portion between the second end portion and the central portion;
   the first end portion having the first end face proximate the first opening, the first end portion extending away from the first opening, and ending at the first intermediate portion, wherein the first end portion is coaxial with the axle tubes entirely between the first end face and the first intermediate portion;
   the first intermediate portion between and connecting the first end portion and the central portion;
   the central portion being offset from the first and second intermediate portions;
   the second intermediate portion between and connecting the central portion and the second end portion;
   the second end portion having the second end face proximate the second opening, the second end portion extending away from the second opening and ending at the second intermediate portion, wherein the second end portion is coaxial with the axle tubes entirely between the second end and the second intermediate portion.

2. The axle of claim 1 wherein the central portion of the continuous support rib defines a portion of a mounting surface for a removable cover to access the differential and portions of the shafts.

3. The axle of claim 1 wherein the continuous support rib extends from a lower portion of the housing in a substantially vertical direction.

4. The axle of claim 3 wherein the continuous support rib is a first support rib, and the housing further having a second support rib extending from an upper portion of the housing in the substantially vertical direction.

5. An axle assembly comprising:
a pair of axle tubes fixedly extending from first and second openings of a housing, the housing defining a support rib extending outwardly from an exterior surface of the housing, the support rib extends from a first end portion to a second end portion wherein each end portion extends entirely along an axis that is coaxial with a center-line of the axle tubes, the first end portion has a first end face proximate the first opening, the second end portion has a second end face proximate the second opening, the support rib further having a central portion offset from a center-line of the axle tubes, the support rib further having a first intermediate portion between and directly connecting the first end portion to the central portion, and a second intermediate portion between and directly connecting the central portion to the second end portion, wherein the first end face and the second end face each face away from one another.

6. The axle assembly of claim 5 wherein a portion of the central portion of the support rib defines a portion of an access cover mounting surface.

7. The axle assembly of claim 5 wherein the support rib is a first support rib extending from a lower portion of the housing and the housing further defines a second support rib extending from an upper portion of the housing.

8. The axle assembly of claim 7 wherein portions of the first support rib defines an upper portion of an access cover mounting surface, and portions of the second support rib defines a lower portion of the access cover mounting surface.

9. The axle assembly of claim 8 wherein the housing further defines a number of cover attachment holes, wherein some of the number of cover attachment holes are disposed along the central portions of the first and second support ribs.

10. The axle assembly of claim 9 further comprising a cover removably connected to the housing via fasteners, some of the fasteners utilizing cover attachment holes in the support ribs.

11. A differential housing defining first and second openings for axle tubes, comprising:
a continuous support rib that extends from a first end portion to a second end portion, each end portion entirely extending along an axis substantially coaxially with the axle tubes and a central portion offset from the first and second end portions, wherein the first and second end portions define a first end face and a second end face respectively that face the axle tubes;
the continuous support rib having a first intermediate portion between the first end portion and the central portion, and a second intermediate portion between the second end portion and the central portion;
the first end portion having the first end face proximate the first opening, the first end portion extending away from the first opening, and ending at the first intermediate portion, wherein the first end portion is coaxial with the axle tubes entirely between the first end face and the first intermediate portion;
the first intermediate portion between and connecting the first end portion and the central portion;
the central portion being offset from the first and second intermediate portions;
the second intermediate portion between and connecting the central portion and the second end portion;
the second end portion having the second end face proximate the second opening, the second end portion extending away from the second opening and ending at the second intermediate portion, wherein the second end portion is coaxial with the axle tubes entirely between the second end and the second intermediate portion.

12. The differential housing of claim 11, wherein the first end terminates at a free end surface facing the first opening.

13. The differential housing of claim 12, wherein the second end terminates at a free end surface facing the second opening.

* * * * *